United States Patent Office 3,349,028
Patented Oct. 24, 1967

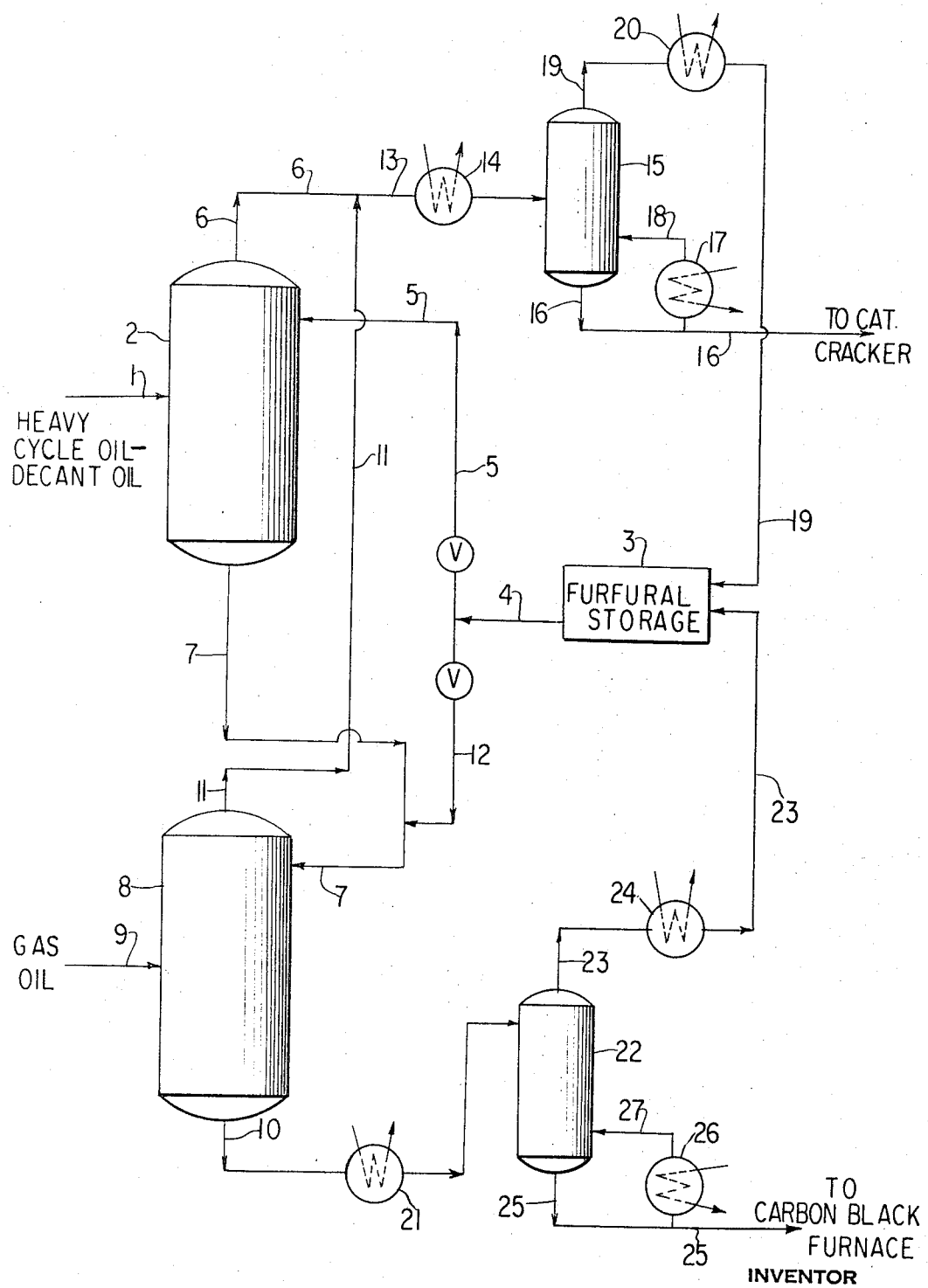

3,349,028
CONTINUOUS SOLVENT EXTRACTION OF DECANT, CYCLE AND GAS OILS
Warren E. Burch, Lake Charles, La., assignor to Cities Service Oil Company, Bartlesville, Okla., a corporation of Delaware
Filed July 9, 1965, Ser. No. 470,863
6 Claims. (Cl. 208—327)

This invention relates to the treatment of petroleum oils by solvent refining to obtain as products a highly aromatic fraction especially suitable for use as a carbon black feedstock and a nonaromatic fraction especially suitable for use as a feedstock for a catalytic cracking process.

Carbon black is a particulate material which is especially useful as a reinforcing agent for rubber compounds. At present, the predominant process for manufacturing carbon black in the so-called "furnace process." In the manufacture of carbon black by the furnace process, a hydrocarbon feedstock is introduced into a highly heated furnace chamber and is therein thermally decomposed, at least in part, to form carbon black in gaseous suspension, as described for example in U.S. Patents, 2,768,067; 2,779,665; 2,851,337 and 3,079,236. It is well-known in the art that highly aromatic hydrocarbon feedstocks, i.e. feedstocks having a high BMCI value, improve the yield of carbon black obtained from the furnace process.

It is also well-known that a feedstock for a catalytic cracking operation should be substantially free of metals and aromatic hydrocarbon compounds. Metal constituents in cracking stocks poison the cracking catalyst, while aromatic constituents, when subjected to cracking, deposit excess amounts of carbon on the catalyst.

Accordingly, it is one object of the present invention to provide a process for solvent refining a mixture of aromatic and nonaromatic hydrocarbons to recover a raffinate phase containing a major portion of the nonaromatic hydrocarbons (i.e. paraffinic and/or naphthenic hydrocarbons) in the mixture and an extract phase containing a major portion of the aromatic hydrocarbons in the mixture.

It is another object of the invention to provide a process for solvent refining a mixture of aromatic and nonaromatic hydrocarbons to recover a raffinate phase suitable for use as a catalytic cracking feedstock and an extract phase containing aromatic concentrate suitable for use as a carbon black feedstock.

It is a further object of the invention to provide a solvent refining process for manufacturing a catalytic cracking feedstock which is substantially free of metallic and aromatic constituents.

It is still a further object of the invention to provide a solvent refining process for manufacturing an aromatic concentrate having a high BMCI value and being especially suitable for use in the manufacture of furnace carbon black in high yield.

It is still a further object of the invention to provide a solvent refining process to recover a raffinate phase and an aromatic extract phase whereby the solvent to feed ratio and operating and capital expenses may be minimized.

It is still a further object of the invention to maximize the quantity and quality of catalytic cracking feedstock and to increase the quality of carbon black feedstock.

These and other objects and advantages of the invention as will become apparent to those skilled in the art from the following detailed description thereof, are accomplished by a novel two-stage solvent extraction process. In the first stage of the process a relatively heavy hydrocarbon feed containing significant quantities of aromatic and nonaromatic hydrocarbons is intimately contacted with a solvent for the aromatic hydrocarbons to provide a first raffinate phase containing a major portion of the nonaromatic hydrocarbons and a minor portion of the solvent and a first solvent extract phase containing a major portion of the solvent and aromatic hydrocarbons. In the second stage of my process, at least a portion, and preferably substantially all of the solvent extract phase obtained from the first extraction stage is intimately contacted with additional relatively heavy hydrocarbon feed containing significant quantities of aromatic and nonaromatic hydrocarbons to provide a second raffinate phase containing a major portion of nonaromatic hydrocarbons and a second solvent extract phase containing a major portion of the solvent and aromatic hydrocarbons. The first and second raffinates obtained from the extraction columns may be combined, and subjected to a distillation operation to remove therefrom any solvent which may be present. The lean raffinate so obtained, containing a high proportion of nonaromatic hydrocarbons, may be used as a high quality feed in a catalytic cracking operation. The solvent extract phase obtained from the second extractor may be subjected to a distillation operation to strip solvent therefrom and the lean extract so obtained, containing a high proportion of aromatic hydrocarbons, may be used as a high quality feedstock for a furnace carbon black manufacturing process.

More particularly, the relatively heavy hydrocarbon feed charged to the first extraction stage of my process should have an initial boiling point of at least about 400° F. and should contain at least about 20% weight percent of aromatic hydrocarbons and at least about 10% weight percent of nonaromatic hydrocarbons (i.e. paraffinic and/or naphthenic hydrocarbons). Advantageously, the initial boiling point is at least about 450° F. and the weight percents of aromatic and nonaromatic hydrocarbons are from about 50 to about 80, and from about 20 to about 50, respectively. Illustrative of suitable charging feeds are heavy cycle oils, light cycle oils, and decant oils, although the preferred charging feed is a mixture of heavy cycle oil and decant oil, particularly a mixture of 50% to 85% by volume of heavy cycle oil and correspondingly 50% to 15% by volume of decant oil. It will be understood that the term "decant oil" as used herein refers to oil which is separated from catalytically cracked material by pouring off from the top of a settling unit and that the term "heavy cycle oil" refers to relatively heavy gas oil which has been subjected at least once to a cracking process (thermal or catalytic), and which is ordinarily lower in API gravity for a given boiling point, lower in H/C ratio, lower in aniline number, higher in unsaturation and aromaticity, and more refractory toward further cracking than the virgin stock from which it is made.

The solvent employed in the extraction may be any organic solvent which preferentially dissolves aromatic hydrocarbons from mixtures of the same with nonaromatic hydrocarbons. The preferred solvent for this purpose is furfural, although other solvents such as phenol, liquid sulfur dioxide, glycol ethers, etc. may also be used.

The hydrocarbon feed subjected to solvent extraction in the second stage of the process is preferably different from that charged to the first extraction stage. Advantageously, the second stage feed has an initial boiling point of at least about 425° F. and contains from about 5 to about 30 weight percent aromatic hydrocarbons and from about 70 to about 95 weight percent nonaromatic hydrocarbons (i.e. paraffinic and/or naphthenic). According to a preferred embodiment of the invention, this second stage feed is a substantially asphaltene-free gas oil having an initial boiling point of above about 450° F., and containing from about 10 to about 20 weight percent aromatic hydrocarbons and from about 80 to about 90 weight percent nonaromatic hydrocarbons. It will be appreciated by those skilled in the refining art that asphaltene-free gas oil may be obtained by passing a mixture of reduced crude and short resid through a vacuum unit and subsequently passing the vacuum bottoms through a deasphalting unit.

The solvent to oil ratio in the first extraction stage may with advantage, range from about 0.2 to about 5.0 volumes of solvent per volume of oil feed, but preferably ranges from about 0.5:1 to about 2:1. As previously noted, one major advantage of the present process is that the solvent to oil ratio may be minimized. Thus, the rich extract obtained from the first stage may be used with or without additional solvent to extract the hydrocarbon feed to the second extraction stage. Taking into account the solvent contained in the rich extract from the first stage and any fresh solvent which may be added, the solvent to hydrocarbon feed ratio in the second extraction stage may advantageously range from about 0.5:1 to about 5.0:1, and preferably from about 1:1 to about 2:1.

The temperatures at which the first and second stage extractions are carried out are subject to wide variation. The temperatures are dependent upon the particular solvent and oil used, but generally range from about 75° to about 300° F. For instance, when furfural is employed as a solvent, extract outlets of the extractors may be advantageously maintained at a temperature of from about 75° F. to about 200° F. and the raffinate outlets thereof may be maintained at a temperature of about 125° F. to about 225° F. Ordinarily, the temperature at the extract outlet is lower than the temperature at the raffinate outlet. It will be appreciated by those skilled in the art that the optimum temperatures for any specific instance are readily determinable.

The invention will now be further described and explained with reference to the accompanying drawing which diagrammatically depicts one specific embodiment, but will be understood that the invention is not limited to this embodiment, since others will be apparent to those skilled in the art.

As shown in the drawing, a relatively heavy hydrocarbon feed containing significant quantities of aromatic and nonaromatic hydrocarbons, e.g. a mixture of heavy cycle oil and decant oil, is charged through conduit 1 into a conventional extraction column 2. Furfural is charged from storage tank 3 through conduits 4 and 5 to the extraction column 2, wherein it is caused to intimately contact the hydrocarbon feed under countercurrent flow conditions at a temperature and solvent to oil volume ratio as noted above.

The furfural selectively dissolves the aromatic hydrocarbon constituents of the feed to form an extract phase and a solvent immiscible raffinate stage. The raffinate phase, which contains predominantly nonaromatic hydrocarbons, is removed from the top of column 2 through conduit 6. The rich extract phase is removed from the bottom of column 2 through conduit 7 and is passed to a second extraction column 8 wherein it is contacted under countercurrent flow conditions with a substantially asphaltene-free gas oil charged through conduit 9. Aromatic hydrocarbon and metallic constituents in the gas oil are selectively dissolved in the furfural extract, thereby forming a second extract, which is removed from the bottom of column 8 through conduit 10, and a second raffinate phase, containing nonaromatic constituents of the gas oil plus nonaromatic constituents from the first stage extract, which is removed from the top of column 8 through conduit 11. If necessary, the volume ratio of furfural to gas oil in the second extraction column 8 may be increased by drawing off furfural from storage tank 3 through lines 4 and 12 and adding to the extract in line 7.

Metallic constituents, such as vanadium, iron and nickel in low concentrations do not cause problems in a carbon black manufacturing operation, but are undesirable in a catalytic cracking feed due to their tendency to poison the cracking catalyst. Furthermore, the most desirable furnace carbon black feedstocks are those containing a high percentage of aromatic hydrocarbons. Cat cracking feedstocks, on the other hand, preferably contain a minimum amount of aromatic hydrocarbons, due to the fact that such hydrocarbons deposit excessive amounts of carbon on the catalyst.

A distinct advantage of the invention is that the use of the rich first stage extract, with or without additional furfural, in the second extraction stage, results in increasing the quantity of a deasphalted gas oil stream, while at the same time extracting the metallic constituents and carbon residue and thus improving its quality as catalytic cracking feedstock. Although the use of solvent alone would extract metallic constituents from this stream, the amount of raffinate would obviously be less than the amount of feed. This increased yield of raffinate is accomplished by the counter solvent properties of the deasphalted gas oil extracting the major portion of remaining nonaromatic constituents from the first stage extract. The overall result is to increase the aromatic concentration of the extract phase while increasing the quantity and quality of the raffinate phase.

The raffinate phases removed from columns 2 and 8 through conduits 6 and 11 respectively, may be combined and passed through conduit 13 to a preheater 14 and then to a conventional stripping tower 15 maintained at a sufficient temperature to distill from the raffinate any furfural (B.P. 329° F.) which may be present therein. The lean raffinate so obtained is removed from stripping tower 15 through conduit 16 and may be passed as a high quality feed to a catalytic cracking unit. If desired, a portion of the lean raffinate may be heated in a reboiler 17 and recirculated through conduit 18 to stripping tower 15 to maintain the desired distillation temperature. The furfural solvent distilled off in tower 15 is removed from the top thereof through conduit 19, condensed in condenser 20 and returned to furfural storage tank 3.

The rich extract phase removed from the bottom of extraction column 8 through conduit 10 is passed to a preheater 21 and subsequently to a stripping tower 22 maintained at a suitable temperature to distill the furfural from the extract. The furfural vapors are passed overhead through conduit 23, condensed in condenser 24 and returned to storage tank 3. Lean extract having a high aromatic content is removed from stripping tower 22 through conduit 25 and may be advantageously employed in a furnace carbon black manufacturing process. If desired, a portion of the lean extract may be heated in a reboiler 26 and recirculated through conduit 27 to stripping tower 22 to maintain the desired distillation temperature.

For the purpose of further describing the invention, the following specific nonlimitative examples are presented:

*Example 1*

Using an apparatus arrangement as described in reference to the drawing, a mixture of 75% by volume of heavy cycle oil and 25% by volume of decant oil was charged to the middle portion of the first extractor at a rate of 10,000 barrels per day (b.p.d.) and concurrently contacted therein with furfural charged to the upper portion of the extractor at a rate of 10,052 b.p.d. The volume ratio of furfural to oil feed was 1.005:1, and the temperature of the raffinate outlet of the column (top) was maintained at about 150° F., while the temperature of the extract outlet (bottom) was maintained at about 100° F.

TABLE 1

| Property | Feed (Cycle Oil and Decant Oil) | Extract | Raffinate |
|---|---|---|---|
| Initial Boiling Pt. (° F.) | 453 | | |
| 10% Boiling Point (° F.) | 597 | | |
| API Gravity at 60° F. | 13.2 | 2.9 | 37.0 |
| Ramsbottom Carbon Residue | 1.65 | 2.5 | 0.154 |
| Aniline Point | 102 | 36 | 203 |
| Metals X-Ray (p.p.m.): | | | |
| Ni | .2 | | .1 |
| Va | .2 | | .1 |
| Fe | .7 | | .2 |
| Viscosity, SSU at 210° F. | 34.3 | 36.0 | 33.6 |
| BMCI | 87 | 118 | |

The extract obtained from the first extractor, containing a predominant portion of aromatic, nitrogen and metallic constituents in the heavy cycle oil-decant oil feed, was charged to the upper portion of a second extractor at a rate of 16,453 b.p.d. (6590 b.p.d. of extract-solvent free basis and 9863 b.p.d. of furfural) and concurrently contacted therein with deasphalted gas oil charged at a rate of 10,330 b.p.d. to the middle portion of the extractor.

Thus, the volume ratio of furfural contained in the extract from the first extractor to deasphalted gas oil feed was about 0.96. The temperature near the raffinate outlet (top) of the second extractor was maintained at about 150° F. and the temperature near the extract outlet (bottom) was maintained at about 100° F.

The extract obtained from the second extractor was distilled to yield 8589 b.p.d. of furfural and 5608 b.p.d. of lean extract. It will be noted from Table 2, below, that the lean extract was found to have a BMCI value of 120 and an API gravity of 1.3 at 60° F., indicating an extremely high aromatic content. Because of these and other properties, the lean extract could be used with advantage as a feedstock to produce furnace carbon black and high yield.

The raffinates obtained from the first and second extractors were combined and passed to a distillation tower to yield 1463 b.p.d. of furfural and 14,722 b.p.d. of lean raffinate. As indicated in Table 1, above, and Table 2, below, the respective raffinates obtained from the first and second extractors had relatively high nonaromatic contents and low metallic contents. The raffinates, are, therefore, desirable catalytic cracking feedstocks.

TABLE 2

| Property | Oil Feed (deasphalted gas oil) | Extract (desolventized) | Raffinat (desolventized) |
|---|---|---|---|
| Initial Boiling Pt. (° F.) | 453 | | |
| 10% Boiling Pt. (° F.) | 823 | | |
| Aromatic Content (wt. percent) | 12 | | |
| Nonaromatic Content (wt. percent) | 35 | | |
| API Gravity at 60° F. | 19.5 | 1.3 | 18.3 |
| Ramsbottom Carbon Residue | 2.31 | 4.75 | 1.07 |
| Aniline Point | 221 | 41.0 | 209 |
| Metals X-Ray (p.p.m.): | | | |
| Ni | 10 | | 1.3 |
| Va | 4 | | 1.1 |
| Fe | 10 | | 1.3 |
| Viscosity, SSU at 210° F. | >600 | 48.5 | 96.3 |
| Asphaltenes | 0.16 | | |
| BMCI | <70 | 120 | |

*Example 2*

The procedure of Example 1 was repeated except as otherwise noted herein. A 75:25 volume mixture of heavy cycle oil and decant oil was extracted with furfural in a ratio of 0.5 volume of furfural to 1.0 volumes of feed.

The inspections of the oil feed and the products (solvent-free) were as follows:

TABLE 3

| Property | Feed | Extract | Raffinate |
|---|---|---|---|
| API Gravity at 60° F. | 13.7 | 2.9 | 38.1 |
| Ramsbottom Carbon Residue | 4.09 | | |
| Aniline Point | 110 | | |
| Viscosity, SSU at 210° F. | 34.1 | 36.2 | 33.2 |
| BMCI | 90 | 119 | |

Fresh furfural was added to the solvent extract obtained from the first extract and the resultant stream was charged to a second extractor and contacted therein with deasphalted gas oil. The volume ratio of solvent contained in the first extract to deasphalted gas oil was 1.27:1 and the volume ratio of make-up furfural to gas oil was 0.5:1. Thus, the second extraction stage was operated at a total solvent to gas oil ratio of 1.77:1.

The inspections of the oil feed and the products (desolventized) from the second extraction were as follows:

TABLE 4

| Property | Oil Feed | Extract | Raffinate |
|---|---|---|---|
| API Gravity at 60° F. | 18.9 | 0.1 | 16.8 |
| Ramsbottom Carbon Residue | 2.40 | 4.08 | 0.97 |
| Aniline Point | 215 | 60.4 | 190 |
| Metals X-Ray (p.p.m.): | | | |
| Ni | 8 | | 1.0 |
| Va | 1 | | 1.0 |
| Fe | 20 | | 2.0 |
| Viscosity, SSU at 210° F. | | 43.5 | 69.1 |
| Asphaltenes (percent) | 0.26 | | |
| BMCI | | 126 | |

It will be noted that the lean extract and lean raffinate possess properites which make them desirable for use as a carbon black feedstock and as a catalytic cracking feedstock, respectively.

*Example 3*

Example 2 was repeated except that fresh make-up furfural was not added to the rich extract charged to the second extractor. The volume ratio of furfural to deasphalted gas oil was, therefore, approximately 1.27:1. Following solvent stripping, the extract and raffinate obtained from the second extractor were found to have the following properties:

TABLE 5

| Property | Lean Extract | Lean Raffinate |
|---|---|---|
| API Gravity at 600° F. | 2.1 | 15 |
| Ramsbottom Carbon Residue | 4.29 | 1.37 |
| Aniline Point | 72.3 | 188 |
| Metals X-Ray (p.p.m.) | | |
| Ni | | 2 |
| Va | | 1 |
| Fe | | 3 |
| Viscosity, SSU at 210° F. | 46.3 | 66.9 |
| BMCI | 117 | |

The above data indicates that even without the addition of make-up furfural, the rich extract from the first extractor very selectively extracts metallic and aromatic constituents from gas oil in the second extractor.

While the invention has been described above with reference to certain preferred embodiments thereof, it will be understood by those skilled in the art that various changes and modifications may be made without departing from the spirit and scope of the invention as expressed in the appended claims.

Therefore, I claim:

1. A solvent extraction process for treating hydrocarbon feed to obtain a separate portion of aromatic hydrocarbons having nitrogen and metallic constituents suitable for carbon black feedstock and a separate portion of nonasphaltic, nonaromatic hydrocarbons substantially free of nitrogen and metallic components and suitable for catalytic cracking, said process comprising:

(a) intimately contacting a first hydrocarbon feed having an initial boiling point of at least 450° F. and containing 50% to 85% (vol.) heavy cycle oil, 50% to 15% (vol.) decant oil, said hydrocarbon feed comprising a mixture of 50% to 80% (wt.) aromatic hydrocarbons, 20% to 50% (wt.) nonaromatic hydrocarbons and containing significant quantities of nitrogen and metallic constituents with a first solvent for said aromatic hydrocarbons, thereby forming a first extract phase containing a major portion of said first solvent, a major portion of said aromatic hydrocarbons, and a major portion of said nitrogen and metallic constituents and a first raffinate phase containing a minor portion of said first solvent, a minor portion of said aromatic hydrocarbons, a minor proportion of said nitrogen and metallic constituents, and a major portion of said nonaromatic hydrocarbons;

(b) separating said first extract phase from said first raffinate phase;

(c) intimately contacting a second hydrocarbon feed comprising a substantially asphaltene-free gas oil having an initial boiling point of at least about 450° F. and containing from about 10% to about 20% (wt.) aromatic hydrocarbons, from about 80% to about 90% (wt.) nonaromatic hydrocarbons and nitrogen and metallic constituents with at least a portion of said first extract phase and additional quantities of said solvent, thereby forming a second extract phase containing a major portion of said first solvent, a major portion of said additional solvent, a major portion of said aromatic hydrocarbons, and a major portion of said nitrogen and metallic constituents from said first and second hydrocarbon feeds and a second raffinate phase containing a minor portion of said solvents, a minor portion of said nitrogen and metallic constituents, and a major portion of nonaromatic hydrocarbons from said second hydrocarbon feed;

(d) separating said second extract phase from said second raffinate phase;

(e) removing the major portion of solvent from said second extract phase, thereby recovering an aromatic concentrate containing a major portion of said nitrogen and metallic constituents and suitable as carbon black feedstock; and (f) removing solvent from said first and second raffinate phases, thereby recovering a mixture of predominantly nonaromatic hydrocarbons substantially free of nitrogen and metallic constituents and suitable for catalytic cracking feedstock.

2. Solvent extraction process as in claim 1 wherein said second hydrocarbon feed is intimately contacted with substantially all of said first extract phase.

3. Solvent extraction process as in claim 1 wherein the extraction of said first hydrocarbon feed is carried out at a ratio of from about 0.2 to about 5.0 volumes of solvent per volume of hydrocarbon feed, and the extraction of said second hydrocarbon feed is carried out at a ratio of from about 0.5 to about 5.0 volumes of solvent per volume of second hydrocarbon feed.

4. Solvent extraction process as in claim 3 wherein the extraction of said first hydrocarbon feed is carried out at a ratio of from about 0.5 to about 2.0 volumes of solvent per volume of hydrocarbon feed, and the extraction of said second hydrocarbon feed is carried out at a ratio of from about 1.0 to about 2.0 volumes of solvent per volume of second hydrocarbon feed.

5. The solvent extraction process of claim 1, wherein said solvent is furfural.

6. The solvent extraction process of claim 1 wherein said metallic constituents are taken from a group consisting of vanadium, iron and nickel.

References Cited
UNITED STATES PATENTS

| | | | |
|---|---|---|---|
| 2,201,549 | 5/1940 | Van Dijck | 208—317 |
| 2,608,470 | 8/1952 | Helmers et al. | 208—87 |
| 2,693,441 | 11/1954 | Helmers | 208—87 |
| 2,748,055 | 5/1956 | Payne | 208—314 |
| 2,794,710 | 6/1957 | Lawson | 208—87 |
| 2,895,895 | 7/1959 | Ridder et al. | 208—87 |
| 2,928,788 | 3/1960 | Jezl | 208—314 |
| 3,200,062 | 8/1965 | Britton | 208—87 |

DELBERT E. GANTZ, *Primary Examiner.*

HERBERT E. LEVINE, *Examiner.*